Figures 1, 2, 3:
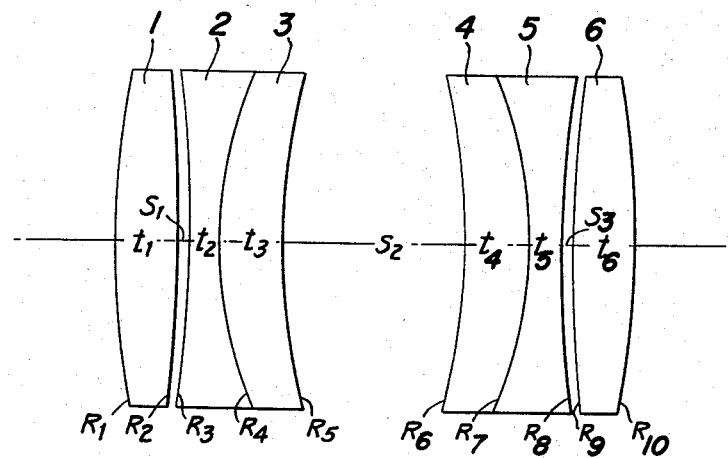

March 13, 1951     W. SCHADE     2,544,901

APOCHROMATIC PROCESS LENSES

Filed Aug. 6, 1949     3 Sheets-Sheet 1

| EF = 100 mm. | | | | f/10 |
|---|---|---|---|---|
| LENS | $N_D$ | V | RADII | THICKNESSES |
| 1 | 1.744 | 45.9 | $R_1 = +28.6$ mm. | $t_1 = 1.97$ mm. |
| | | | $R_2 = -52.0$ | $S_1 = .33$ |
| 2 | 1.614 | 44.2 | $R_3 = -40.7$ | $t_2 = .99$ |
| 3 | 1.617 | 54.9 | $R_4 = +12.95$ | $t_3 = 1.97$ |
| | | | $R_5 = +28.0$ | $S_2 = 5.60$ |
| SYMMETRICAL | | | | |

| EF = 100 mm. | | | | | f/10 |
|---|---|---|---|---|---|
| LENS | $N_D$ | V | P | RADII | THICKNESSES |
| 1 | 1.697 | 56.1 | .542 | $R_1 = +24.73$ mm | $t_1 = 1.62$ mm. |
| | | | | $R_2 = -39.51$ | $S_1 = .36$ |
| 2 | 1.612 | 44.4 | .558 | $R_3 = -32.60$ | $t_2 = .90$ |
| 3 | 1.617 | 36.6 | .582 | $R_4 = +15.77$ | $t_3 = 1.35$ |
| | | | | $R_5 = +25.66$ | $S_2 = 5.89$ |
| SYMMETRICAL | | | | | |

Willy Schade
INVENTOR

BY
ATTORNEYS

March 13, 1951  W. SCHADE  2,544,901
APOCHROMATIC PROCESS LENSES
Filed Aug. 6, 1949  3 Sheets-Sheet 3

| EF = 100 mm. | | | | f/10 |
|---|---|---|---|---|
| LENS | $N_D$ | V | RADII | THICKNESSES |
| 1 | 1.697 | 56.1 | $R_1 = +24.69$ mm | $t_1 = 1.62$ mm. |
| | | | $R_2 = -39.44$ | $S_1 = 0.36$ |
| 2 | 1.611 | 57.2 | $R_3 = -31.88$ | $t_2 = 0.36$ |
| 3 | 1.612 | 44.4 | $R_4 = -32.05$ | $t_3 = 0.54$ |
| 4 | 1.617 | 36.6 | $R_5 = +15.74$ | $t_4 = 1.35$ |
| | | | $R_6 = +25.60$ | $S_2 = 5.87$ |
| SYMMETRICAL | | | | |

Willy Schade
INVENTOR
BY
ATTORNEYS

Patented Mar. 13, 1951

2,544,901

UNITED STATES PATENT OFFICE 2,544,901

APOCHROMATIC PROCESS LENS

Willy Schade, Rochester, N. Y., assignor to Eastman Kodak Company, Rochester, N. Y., a corporation of New Jersey Application August 6, 1949, Serial No. 109,013

7 Claims. (Cl. 88—57)

This application is a continuation-in-part of Serial No. 789,641, filed December 4, 1947, formally abandoned August 6, 1949.

This invention relates to photographic objectives of the type known as process lenses. Process lenses are used for copying photographs, printed matter, and the like at finite conjugates for photoengraving work and the like, and it is important that they render fine details very sharply.

Recent improvements in the graphic arts have been such that ordinary process lenses have proven unsatisfactory for high quality three-color work because they are corrected for only two colors. Furthermore, the lack of variety of the special short flint glasses has been a serious obstacle to the development of special apochromatic objectives. The use of crystalline materials has been proposed in such lenses, but this involves special problems because suitable crystals have extremely poor weathering qualities and are hard to grind and polish with optical accuracy.

According to the present invention, an apochromatic process lens is made up entirely of non-crystalline optical glasses and consists of two outer convergent components and two biconcave components axially aligned therebetween. Each convergent component consists of a single element of glass having a refractive index between 1.67 and 1.78 and a V-number between 44 and 62 and has a dioptric power between 3.2 D and 5.0 D where D is the power of the objective as a whole. The outer surface of each convergent component is the more strongly curved and is, of course, convex. Each biconcave component is a cemented component comprising a negative element of a short flint glass and at least one positive element of a glass with an ordinary or "long" blue partial dispersion ratio. The power of each biconcave component is between $-2.8$ D and $-5.0$ D. The power of each component is taken as the algebraic sum of the powers of its individual surfaces for the purposes of this comparison.

The central space of the objective is larger than three times the sum of the other two spaces, and the overall length of the objective is between $0.1$ F and $0.2$ F where F is the focal length of the objective.

By way of explanation, the well known fact is pointed out that the refractive index of nearly all kinds of optical glass in the ordinary range of V-values varies with the wave length of light in such a manner that, $$Pg + .00169\, V = 0.644 \text{ approximately}$$

where $Pg$ is the partial dispersion ratio $$\frac{N_g - N_F}{N_F - N_C}$$

and V is the customary reciprocal dispersive index $$\frac{N_D - 1}{N_F - N_C}$$

the refractive index N in each case pertaining to the spectral line denoted by the subscript given therewith.

In the range of V-values from about 38 to about 70 or beyond, the above relationship holds within $\pm 0.002$ in the great majority of glasses produced commercially. (The very dense lead flints, however, tend to have a slightly higher P-value.) It is for this reason that in all ordinary achromats the focal length for the blue rays is longer than that for the yellow and green for which such achromats are corrected.

A few special flints have been produced which tend to shorten the focal length of the blue (hence the name "short flint"). In objectives according to the present invention it is desirable that each short flint glass element have a lower refractive index V-value than the glass in the adjacent outer component and that the value of $(P + .00169\, V)$ be less than $0.636$. This value may be as low as it is possible to make the glass. At present it does not appear possible to go below $0.630$. Short flints meeting these requirements have been produced on a commercial scale, and lie roughly along a line on the customary glass chart between the points $N_D = 1.55$, $V = 55$ and $N_D = 1.62$, $V = 43$. Other short flint glasses, a series of beryllium lead borates, are described in a copending application, Serial Number 737,342, filed March 26, 1947, by Sun, Callear and Scharf, now Patent No. 2,511,228, issued June 13, 1950. These glasses are somewhat higher in refractive index (up to about 1.65) and have V-value between 40 and 45. All these suitable short flints lie along the line between the points $N_D = 1.55$, V=55 and N_D=1.65, V=40, deviating therefrom by less than 0.015 in refractive index. It is obvious that this offers a very limited choice of optical constants.

The short flint glasses heretofore commercially available have rather poor weathering qualities (although still much better than suitable crystals) and should be protected from the atmosphere when in use. This may be done by cementing them between two elements of stable glass or by applying a protective coating to the exposed surface such as in the known manner involving vacuum coating of SiO on the surface and then allowing it to oxidize in air to form $SiO_2$. On the other hand, the beryllium lead borates, mentioned above, are more stable and are suitable for use either with or without a protective cover.

In regard to glasses for use in the outer convergent components, the best glasses which have been made on a commercial scale are the rare-earth borate glasses manufactured for several years by the Eastman Kodak Company and the dense crowns produced by Schott in Germany during the war and designated as SK-21 and SK-22. These glasses are slightly shorter in the blue than ordinary glasses, and this is somewhat of a disadvantage. A series of lanthanum fluoborate glasses are described in Patent No. 2,456,033 Sun, issued December 14, 1948. These lie in the same range of desirable N- and V-values, are better in regard to the partial dispersions, and are useful in objectives according to the present invention.

In regard to the positive elements which are cemented to the negative elements, a wide range of choice of N- and V-values is suitable, but it is governed to some degree by the choice of glasses in the other elements. If the short flint differs but little in V-value from the glass in the adjacent outer convergent component, then the element cemented to the short flint must have a considerably higher V-value than either, but if the first two differ greatly, then the third may even have a lower V-value than the short flint. The essentional rule is that the average of the V-values of the positive elements in each half of the objective should be between 104% and 140% of that of the short flint glass used in the negative element in the same half. The refractive index of the cemented positive element may be chosen within wide limits, but preferably it should be between 1.5 and 1.7. This element should have normal partial dispersions or a long blue spectrum, that is $(P+.00169V)$ is 0.644 or greater. Glasses containing a significant amount of fluorine (a mol percentage of at least 10%) have been produced and are particularly notable in this respect. Of these, the fluophosphate glasses described in the two copending applications Serial Numbers 644,178 Sun and Huggins, and 644,179 Sun, filed January 29, 1946, now Patents No. 2,481,700, issued September 13, 1949, and No. 2,511,225, issued June 13, 1950, appear most suitable for objectives according to the present invention. They have values of $(P+.00169V)$ extending nearly as high at 0.67 and V-values in the range from 68 to 76.

Commercially available glasses, however, are at present restricted to a P-value much nearer the ordinary.

In the objectives thus far designed according to the invention, I have found it preferable to give the front and rear airspaces very small power, between +0.6 and −0.3 times that of the objectives as a whole. Also the radii of curvature of the front surface of the front component and of the rear surface of the rear component are preferably between 0.18 F and 0.35 F in order to correct the spherical aberration, coma and field curvature.

With glasses now commercially available, the cemented surfaces of the biconcave components preferably have radii of curvature between 0.1 F and 0.3 F to achieve apochromatic correction. The other glasses mentioned will permit lenses to be produced in which the cemented surfaces have somewhat longer radii, perhaps up to 0.75 F. This is of great advantage in reducing manufacturing costs.

Figures 4, 5:
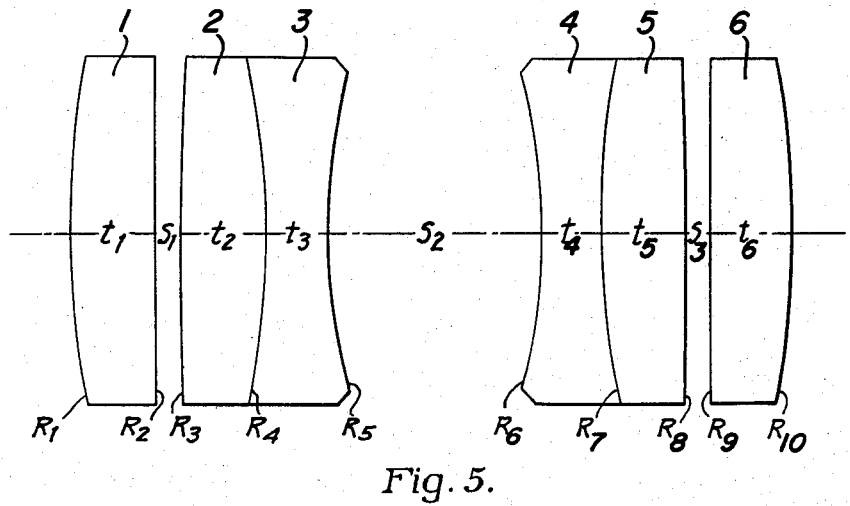
Figures 6, 7:
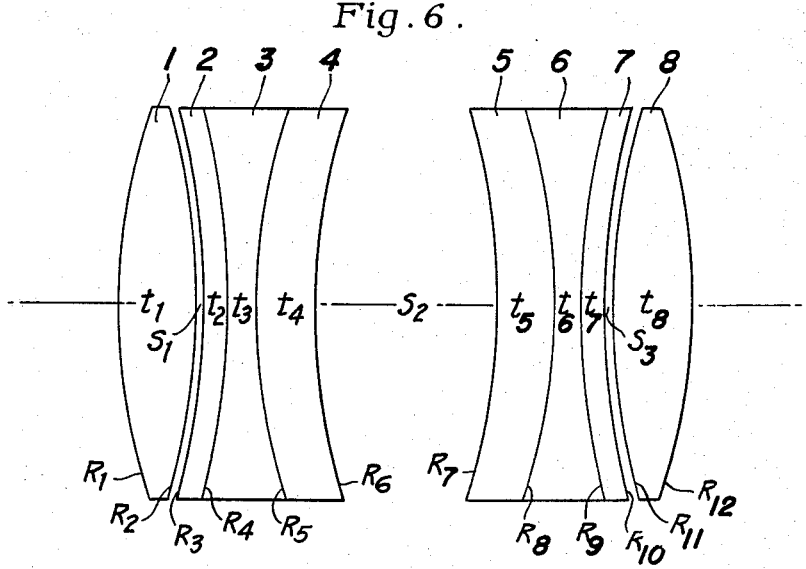

In the accompanying drawings Figs. 1, 4 and 6 show objectives according to the invention and Figs. 2, 3, 5 and 7 give structural data for four specific examples. These data are repeated below. Example 2 below is a variant of Example 1 with a somewhat different selection of glasses, and Example 3 is another variant using a glass of the beryllium lead borate type. In each case the data are given corresponding to an equivalent focal length of 100 mm. and the objective is designed to work at a maximum aperture of f/10.

Example 1, Figs. 1 and 2:

| Lens | N | V | $P_\epsilon$ | Radii | Thicknesses |
|---|---|---|---|---|---|
| 1 | 1.744 | 45.9 | .562 | $R_1=+28.62$ mm. $R_2=-51.98$ | $t_1=1.97$ mm. $s_1=.33$ |
| 2 | 1.614 | 44.2 | .559 | $R_3=-40.69$ | $t_2=.99$ |
| 3 | 1.617 | 54.9 | .551 | $R_4=+12.96$ $R_5=+27.97$ | $t_3=1.97$ $s_2=5.60$ |

Symmetrical.

Example 2, Figs. 1 and 3:

| Lens | N | V | $P_\epsilon$ | Radii | Thicknesses |
|---|---|---|---|---|---|
| 1 | 1.697 | 56.1 | .542 | $R_1=+24.73$ mm. $R_2=-39.51$ | $t_1=1.62$ mm. $s_1=.36$ |
| 2 | 1.612 | 44.4 | .558 | $R_3=-32.60$ | $t_2=.90$ |
| 3 | 1.617 | 36.6 | .582 | $R_4=+15.77$ $R_5=+25.66$ | $t_3=1.35$ $s_2=5.89$ |

Symmetrical.

Example 3, Fig. 1:

| Lens | N | V | $P_\epsilon$ | Radii | Thicknesses |
|---|---|---|---|---|---|
| 1 | 1.734 | 51.2 | .550 | $R_1=+24.38$ mm. $R_2=-46.32$ | $t_1=1.62$ mm. $s_1=0.36$ |
| 2 | 1.635 | 43.8 | .559 | $R_3=-37.23$ | $t_2=0.90$ |
| 3 | 1.605 | 43.6 | .571 | $R_4=+14.19$ $R_5=+25.58$ | $t_3=1.35$ $s_2=5.86$ |

Symmetrical.

Example 4, Figs. 4 and 5:

| Lens | N | V | $P_\epsilon$ | Radii | Thicknesses |
|---|---|---|---|---|---|
| 1 | 1.745 | 45.8 | .563 | $R_1=+20.43$ mm. $R_2=\infty$ | $t_1=1.29$ mm. $s_1=.37$ |
| 2 | 1.518 | 59.6 | .544 | $R_3=+124.1$ | $t_2=1.34$ |
| 3 | 1.614 | 44.3 | .558 | $R_4=-24.4$ $R_5=+17.65$ | $t_3=.98$ $s_2=3.30$ |

Symmetrical.

Example 5, Figs. 6 and 7:

| Lens | N | V | $P_\epsilon$ | Radii | Thicknesses |
|---|---|---|---|---|---|
| 1 | 1.697 | 56.1 | .542 | $R_1=+24.69$ mm. $R_2=-39.44$ | $t_1=1.62$ mm. $s_1=0.36$ |
| 2 | 1.611 | 57.2 | .548 | $R_3=-31.88$ | $t_2=0.36$ |
| 3 | 1.612 | 44.4 | .558 | $R_4=-32.05$ | $t_3=0.54$ |
| 4 | 1.617 | 36.6 | .582 | $R_5=+15.74$ $R_6=+25.60$ | $t_4=1.35$ $s_2=5.87$ |

Symmetrical.

Example 5 is much like Example 2 except that each short flint element is cemented between two other elements. To reduce the design time and the tool cost, element 2 was assigned substantially zero power. This, however, is not an essential feature, as this element may equally well have positive or slightly negative power.

Each table gives data for the front half of the lens and the notation "Symmetrical" which indicates that the rear half is symmetrical thereto. The lens elements are numbered in order from front to rear, and the corresponding refractive index $N$ or $N_D$, dispersive index $V$ and partial dispersion ratio $P_g$ are given for each element. In the last two columns the radii of curvature $R$, the thicknesses $t$ and the spaces $s$ are given, each being numbered by subscripts from front to rear. The $+$ and $-$ values of the radii indicate surfaces respectively convex and concave toward the front.

The notation "Symmetrical" will be understood as usual to indicate in the case of the first four examples, that elements 4, 5, and 6 are made of the same glasses as elements 3, 2, and 1 respectively, that $R_6$ to $R_{10}$ are numerically equal to $R_5$ to $R_1$ respectively and have the opposite signs, and that $t_4$, $t_5$, $t_6$ and $s_3$ are equal to $t_3$, $t_2$, $t_1$ and $s_1$ respectively, and in the case of Example 5 that elements 5 to 8 are made of the same glasses as elements 4 to 1 respectively, that $R_7$ to $R_{12}$ are numerically equal to $R_6$ to $R_1$ respectively and have the opposite signs, and that $t_5$ to $t_8$ and $s_3$ are equal to $t_4$ to $t_1$ and $s_1$ respectively. Although each example has the feature of exact symmetry, which has certain known advantages when embodied in objectives used at finite conjugates, the invention is not limited to exactly symmetrical objectives.

All the features above discussed, including the incidental features of the examples shown as well as the broad features of the invention, are summarized in the following table of algebraic inequalities:

$$1.67 < N_I < 1.78$$
$$44 < V_I < 62$$
$$1.55 < N_a < 1.65$$
$$40 < V_a < 55$$
$$(P_a + .00169 V_a) < .636$$
$$1.5 < N_b < 1.7$$
$$2.08 V_a < (V_I + V_b) < 2.80 V_a$$
$$(P_b + .00169 V_b) > .644$$
$$3.2D < D_I < 5.0\ D$$
$$2.8D < -D_{II} < 5.0\ D$$
$$-0.3\ D < D_s < +0.6\ D$$
$$R_1 < \pm R_2$$
$$0.18F < R_1 < 0.35\ F$$
$$0.1F < \pm R_4 < 0.75\ F$$
$$0.1F < O.L. < 0.2\ F$$
$$3(S_1 + S_3) < S_2$$

where the subscripts I, II, $a$, $b$, and $s$ refer respectively to the outer convergent component, the biconcave component, the negative element of the biconcave component, the positive element of the biconcave component, and the space between these two components, all of the same half of the objective, where D indicates a dioptric power, where D and F without a subscript denote the dioptric power and the equivalent focal length respectively of the objective as a whole, where O.L. denotes the over-all length of the lens, and where $s_1$, $s_2$, and $s_3$ are the three airspaces taken in order. It is to be understood that the last two lines of the table pertain to the objective as a whole and all the others hold true for each half of the objective taken separately.

The following table gives some of the values in question:

|  | Ex. 1 | Ex. 2 | Ex. 3 | Ex. 4 |
| --- | --- | --- | --- | --- |
| $(P_a + .00169\ V_a)$ | .634 | .633 | .633 | .633 |
| $(P_b + .00169\ V_b)$ | .644 | .644 | .645 | .645 |
| $(V_I + V_b)/V_a$ | 2.28 | 2.09 | 2.16 | 2.38 |
| $D_I/D$ | 4.03 | 4.58 | 4.60 | 3.65 |
| $D_s/D$ | $-.08$ | $-.11$ | $-.12$ | $+.42$ |
| O. L./F | .16 | .14 | .14 | .11 |

Example 5 is substantially the same as Example 2 in respect to these characteristics. The values of the other quantities are given directly in the tables of structural data, and it is easily seen that all the features of the invention are embodied in each of the three examples.

I claim:

1. A photographic objective consisting of two simple convergent components and two compound biconcave components axially aligned therebetween and separated by a central airspace, in which each convergent component has a refractive index between 1.67 and 1.78, a V-value $V_I$ between 44 and 62, a dioptric power between 3.2D and 5.0D where D is the power of the objective as a whole, and has its more strongly curved surface to the outside, and in which each biconcave component has a power between $-2.8D$ and $-5.0D$ and includes a dispersive element with refractive index and V-value $V_a$ lower than that of the adjacent convergent component and partial dispersion ratio $P_a$ defined as $(N_g - N_F)/(N_F - N_C)$ such that $(P_a + .00169\ V_a)$ is less than 0.636 and cemented thereto a convergent element with refractive index between 1.5 and 1.7, with V-value $V_b$ such that $$2.08\ V_a < (V_I + V_b) < 2.80\ V_a$$

and with partial dispersion ratio $P_b$ such that $(P_b + .00169\ V_b)$ is 0.644 or greater, the over-all length of the objective being between 0.1 F and 0.2 F where F is the focal length of the objective and where $N_g$, $N_F$, and $N_C$ are the refractive indices for the $g$, F, and C lines of the spectrum respectively.

2. An objective according to claim 1 in which the power of each airspace between adjacent convergent and biconcave components is between $-0.3D$ and $+0.6D$, and the sum of the lengths of these two airspaces is less than one-third that of the central airspace.

3. An objective according to claim 2 in which the outer surface of each convergent component has a radius of curvature numerically between 0.18 F and 0.35 F and the radius of curvature of the cemented surface of each biconcave component is numerically between 0.1 F and 0.75 F.

4. An objective according to claim 1 in which the outer surface of each convergent component has a radius of curvature numerically between 0.18 F and 0.35 F and the radius of curvature of the cemented surface of each biconcave component is numerically between 0.1 F and 0.75 F.

5. A photographic objective consisting of two simple convergent components and two compound biconcave components axially aligned therebetween and separated by a central airspace, in which each convergent component has a refractive index between 1.67 and 1.78, a V-value $V_I$ between 44 and 62, a power between 3.2D and 5.0D where D is the power of the objective as a whole, and has its more strongly curved surface to the outside, in which each biconcave component has a power between $-2.8D$ and $-5.0D$ and consists of a dispersive element cemented between two other elements of which the stronger one is positive, the said dispersive element of each biconcave component having a refractive index and V-value $V_a$ lower than that of the adjacent convergent component and having a partial dispersion ratio $P_a$ defined as $(N_g-N_F)/(N_F-N_C)$ such that $(P_a+.00169V_a)$ is less than 0.636 and the said stronger element cemented thereto having a refractive index between 1.5 and 1.7, a V-value $V_b$ such that $$2.08\ V_a < (V_I + V_b) < 2.80\ V_a$$

and a partial dispersion ratio $P_b$ such that $(P_b+.00169\ V_b)$ is 0.644 or greater, and in which the over-all length of the objective is between one-tenth and one-fifth of the focal length of the objective, $N_g$, $N_F$, and $N_C$ being the refractive indices for the $g$, $F$, and $C$ lines of the spectrum, respectively.

6. A photographic objective consisting of two outer convergent components and two biconcave cemented doublet components axially aligned therebetween substantially according to the following specifications:

| Lens | N | V | P | Radii | Thicknesses |
|---|---|---|---|---|---|
| 1 and 6 | 1.70 | 56. | .562 | $R_1=-R_{10}=+.25\ F$<br>$R_2=-R_9=-.40\ F$<br>$R_3=-R_8=-.33\ F$<br>$R_4=-R_7=+.16\ F$<br>$R_5=-R_6=+.26\ F$ | $t_1=t_6=.02\ F$<br>$s_1=s_3<.01\ F$<br>$t_2=t_5<.01\ F$<br>$t_3=t_4<.02\ F$<br>$s_2=.06\ F$ |
| 2 and 5 | 1.61 | 44. | .559 | | |
| 3 and 4 | 1.62 | 37. | .551 | | | where the lens elements are numbered in order from front to rear, N is the refractive index for the D line of the spectrum, V is the conventional reciprocal dispersive index $(N-1)/(N_F-N_C)$, P is the partial dispersion ratio $(N_g-N_F)/(N_F-N_C)$, the subscripts on N indicating the line of the spectrum to which each refractive index relates, where the radii R, thicknesses $t$ and spaces $s$ are numbered by subscripts from front to rear, where the $+$ and $-$ values of R indicate surfaces respectively convex and concave toward the front, and where F is the equivalent focal length of the objective.

7. A photographic objective consisting of two outer convergent components and two biconcave cemented doublet components axially aligned therebetween substantially according to the following specifications:

| Lens | N | V | P | Radii | Thicknesses |
|---|---|---|---|---|---|
| 1 and 6 | 1.74 | 46. | .563 | $R_1=-R_{10}=+.20\ F$<br>$R_2=R_9=\infty$<br>$R_3=-R_8=+1.2\ F$<br>$R_4=-R_7=-.24\ F$<br>$R_5=-R_6=+.18\ F$ | $t_1=t_6=.01\ F$<br>$s_1=s_3<.01\ F$<br>$t_2=t_5<.02\ F$<br>$t_3=t_4=.01\ F$<br>$s_2=.03\ F$ |
| 2 and 5 | 1.52 | 60. | .544 | | |
| 3 and 4 | 1.61 | 44. | .558 | | | where the lens elements are numbered in order from front to rear, N is the refractive index for the D line of the spectrum, V is the conventional reciprocal dispersive index $(N-1)/(N_F-N_C)$, P is the partial dispersion ratio $(N_g-N_F)/(N_F-N_C)$, the subscripts on N indicating the line of the spectrum to which each refractive index relates, where the radii R, thicknesses $t$ and spaces $s$ are numbered by subscripts from front to rear, where the $+$ and $-$ values of R indicate surfaces respectively convex and concave toward the front, and where F is the equivalent focal length of the objective.

WILLY SCHADE.

REFERENCES CITED

The following references are of record in the file of this patent:

UNITED STATES PATENTS

| Number | Name | Date |
|---|---|---|
| 583,336 | Rudolph | May 25, 1897 |
| 1,565,205 | Rudolph | Dec. 8, 1925 |
| 2,405,729 | Altman | Aug. 13, 1946 |
| 2,430,548 | Aklin | Nov. 11, 1947 |
| 2,475,938 | Altman | July 12, 1949 |

FOREIGN PATENTS

| Number | Country | Date |
|---|---|---|
| 317,697 | Great Britain | Aug. 22, 1919 |